(12) United States Patent
Mehnert et al.

(10) Patent No.: US 10,190,889 B2
(45) Date of Patent: Jan. 29, 2019

(54) COUNTING SENSOR FOR COUNTING THE NUMBER OF REVOLUTIONS OR OF LINEAR DISPLACEMENTS OF AN OBJECT

(71) Applicant: AVAGO TECHNOLOGIES INTERNATIONAL SALES PTE. LIMITED, Singapore (SG)

(72) Inventors: Walter Mehnert, Ottobrunn (DE); Thomas Theil, Feldafing (DE)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/585,776

(22) Filed: May 3, 2017

(65) Prior Publication Data
US 2017/0322050 A1    Nov. 9, 2017

(30) Foreign Application Priority Data

May 3, 2016  (DE) .......................... 10 2016 207 670
Mar. 7, 2017  (DE) .......................... 10 2017 203 679

(51) Int. Cl.
*G01D 5/14*         (2006.01)

(52) U.S. Cl.
CPC .................... *G01D 5/145* (2013.01)

(58) Field of Classification Search
CPC .... G01D 5/145; G01D 5/2454; G01D 5/2455; G01D 5/142; G01D 5/2497; G01D 5/14;
(Continued)

(56) References Cited

U.S. PATENT DOCUMENTS 7,598,733 B2    10/2009  Mehnert et al.
2011/0006757 A1*  1/2011  Mehnert ............... G01D 5/145
                                                    324/207.2
(Continued)

FOREIGN PATENT DOCUMENTS

DE            10259223 B3    2/2004

*Primary Examiner* — Jay Patidar
(74) *Attorney, Agent, or Firm* — Sheridan Ross P.C.

(57) ABSTRACT

The invention relates to a counting sensor for counting the number of revolutions or of linear displacements of an object, wherein the counting sensor comprises:
  one single Wiegand module;
  at least one sensor element;
  a processing electronics connected to the sensor element; and
  a permanent magnet arrangement, which is movable relative to the Wiegand module; wherein
  the processing electronics is configured to obtain (i) direction informations indicating whether the permanent magnet arrangement moves in one direction or an opposite direction, and (ii) magnetic pole informations; and
  a data storage for storing a value, which indicates the number of the revolutions or of the linear displacements; wherein
  the processing electronics is configured: (i) to determine, on the basis of the direction information and the magnetic pole information, the number of the revolutions or of the linear displacements of the object and to store the corresponding value in the data storage, (ii) to perform, on the basis of a sequence of the direction informations and the magnetic pole informations, an error detection indicating whether one of the revolutions or one of the linear displacements of the object has not been recognized partially or completely, and
(Continued)

(iii) upon detection of the error, to determine a corresponding correction of said number and to correct said value.

8 Claims, 4 Drawing Sheets

(58) Field of Classification Search
CPC ........ G01P 13/04; G01P 3/4815; G01P 3/481; G01P 3/487; G01B 7/30; G01B 7/14; G01R 1/16; G01R 23/00; G06F 15/00
See application file for complete search history.

(56) References Cited

U.S. PATENT DOCUMENTS

| | | | | |
|---|---|---|---|---|
| 2013/0200883 A1* | 8/2013 | Mehnert | .............. | G01R 33/072 324/207.2 |
| 2015/0130450 A1* | 5/2015 | Gehringer | .............. | G01D 5/145 324/207.25 |
| 2015/0354986 A1* | 12/2015 | Mehnert | ................ | G01D 5/145 324/207.16 |

* cited by examiner

COUNTING SENSOR FOR COUNTING THE NUMBER OF REVOLUTIONS OR OF LINEAR DISPLACEMENTS OF AN OBJECT

CROSS-REFERENCE TO RELATED APPLICATIONS

This application claims the benefit of the filing dates of the German Patent Application No. DE 10 2016 207 670.1 filed on May 3, 2016, and of the German Patent Application No. DE 10 2017 203 679.6 filed on Mar. 7, 2017, the disclosure of which is hereby incorporated herein by reference.

FIELD OF THE INVENTION

The invention relates to a counting sensor, which determines a number of revolutions or linear displacements of an object.

TECHNOLOGICAL BACKGROUND

A counting sensor, which has a Wiegand module, is known in the state of the art from the patent document DE 102 59 223 B3.

In this counting sensor, a permanent magnet moves relatively to the Wiegand module, which provides voltage impulses in defined time intervals as a function of the movement frequency.

A processing electronics detects the voltage impulse and determines both the movement direction of the permanent magnet and the position of the north pole and the south pole of the permanent magnet on the basis of the output signal of an additional sensor element and on the basis of the polarity of the voltage impulse. On the basis of these informations, the processing electronics determines a number of the revolutions of the permanent magnet and stores a corresponding value in a data storage.

The known counting sensor can be operated in an autonomous mode, in which no outside energy supply is available. In the autonomous mode, the processing electronics is supplied with energy, which the Wiegand module provides by the output of the voltage impulses. The energy provided by the Wiegand module is sufficient for the determination of said value of the number of the revolutions and for the storing process of the value in the data storage, provided an output of clean voltage impulses.

In the framework of the development activities of the present invention, it has been recognized that during the operation of the known counting sensor, due to certain movement sequences of the permanent magnet, a case may occur that the Wiegand module outputs rudimentary voltage impulses, which are in fact recognized, but which do not supply sufficient energy in order to be able to perform the storage process of said value. In this respect, errors of the stored value and a reduced accuracy of the counting sensor do result.

SUMMARY OF THE INVENTION

Against this background, there may be a need to provide an accurate counting sensor. Preferably, the counting sensor may also have a higher reliability.

According to an exemplary embodiment of the present invention, there is provided a counting sensor for counting the number of revolutions or of linear displacements of an object comprises (i) one single Wiegand module, which is composed of a Wiegand wire having a coil, which encloses the Wiegand wire, (ii) at least one sensor element, (iii) a processing electronics, which is connected to the sensor element and which is configured to evaluate an output signal which is output from the sensor element, and (iv) a permanent magnet arrangement, which is movable relative to the Wiegand module in one direction as well as in a direction that is opposite to said one direction, wherein:

the permanent magnet arrangement is configured to be arranged at/attached to the object such that the permanent magnet arrangement performs the revolutions or the linear displacements together with the object, upon movement of the permanent magnet arrangement in said one direction, the coil of the Wiegand module generates a voltage impulse, if a north pole or a south pole of the permanent magnet arrangement is located at a first position, and, upon movement of the permanent magnet arrangement in said opposite direction, the coil of the Wiegand module generates the voltage impulse, if the north pole or the south pole of the permanent magnet arrangement is located at a second position that is different from said first position.

According to an exemplary embodiment, in the case that linear movements/displacements are to be determined by the counting sensor, the permanent magnet arrangement may comprise at least two magnets or rather four magnetic poles—generally stated 2n magnets (wherein n=1, 2, 3, ..., m)—, whereas in the case that the counting sensor is to determine rotating movements, the permanent magnet arrangement may get along also with only one single magnet. However, even in the case that rotating movements are to be determined, the permanent magnet arrangement may have a plurality of magnets—again, generally stated 2n magnets (wherein n=1, 2, 3, ..., m).

Due to the relative movement of the permanent magnet arrangement with respect to the Wiegand module, and as is experienced by the Wiegand module, there may be effected a change of the magnetic field of the permanent magnet arrangement. According to an exemplary embodiment, the Wiegand wire, which may preferably be manufactured from Vicalloy, is formed in particular/preferably from a soft-magnetic core having a hard-magnetic shell. This construction may result in a physical characteristics of the Wiegand module and/or the Wiegand wire to the effect that a sudden change of the orientation of the Weiss domains/magnetic domains of the Wiegand wire (macroscopic Barkhausen effect) is effected as from a specific amplitude of the magnetic field. This change in turn may result in the generation of the voltage impulse in the coil of the Wiegand module. As a function of in which direction the permanent magnet arrangement moves, i.e. in said one direction or in said direction opposite to said one direction, upon the generation of the voltage impulse, the north pole or the south pole of the permanent magnet arrangement may be located at the said first or said second position. The said voltage impulse may be obtained in particular/preferably, when—starting from the state that the core and the shell have the same magnetic orientation—upon reaching the amplitude of the magnetic field, the Weiss domains/magnetic domains of the soft-magnetic core change their orientation abruptly (or suddenly). With a further movement of the permanent magnet arrangement in the same direction, also a corresponding change of the Weiss domains/magnetic domains of the hard-magnetic shell may be effected because of the further increase of the amplitude. However, the impulse, which is generated thereby, may be much smaller, and may preferably not be evaluated.

Generally stated, the Wiegand wire of the counting sensor according to an exemplary embodiment of the invention is understood to be preferably a wire, which may have a hard-magnetic shell and a soft-magnetic core or preferably a soft-magnetic shell and a hard-magnetic core, which may be operated preferably bipolarly/symmetrically during the intended operation of the counting sensor, i.e. the Weiss domains/magnetic domains of both the shell and the core may change their orientation because of a change of the amplitude and the orientation of the magnetic field of the permanent magnet arrangement.

In an exemplary embodiment of the invention, in an autonomous mode, in which the counting sensor may not be supplied with outside energy (or external energy), the processing electronics may be provided with energy that is provided by the Wiegand module.

In an exemplary embodiment of the invention, the energy that may be provided by the Wiegand module may be preferably stored temporarily in at least one capacitor.

In an exemplary embodiment of the invention, the processing electronics may be configured, after the determination of the voltage impulse that is output by the Wiegand module, (i) to obtain, by an evaluation of the output signal of the sensor element, to the effect, direction informations indicating whether the permanent magnet arrangement moves in said one direction or said opposite direction, and (ii) to obtain, by an evaluation of the output signal of the sensor element or by a determination of the polarity of the voltage impulse generated by the coil of the Wiegand module, magnetic pole informations indicating whether the north pole or the south pole of the permanent magnet arrangement is located at said first or said second position.

In an exemplary embodiment of the invention, in the autonomous mode, the processing electronics may be configured to detect the voltage impulse of the Wiegand module and to subsequently evaluate the output signal of the sensor element for the determination as to whether the north pole or the south pole of the permanent magnet arrangement is located at said first or said second position.

Furthermore, the counting sensor may contain a data storage for storing a value, which may indicate the number of revolutions or of the linear displacements.

In an exemplary embodiment of the invention, the counting sensor may contain a non-volatile data storage, for example a FRAM or an EEPROM, and a volatile data storage. The value, which may indicate the number of revolutions or linear displacements, may be stored in the volatile data memory preferably as long as the Wiegand module provides sufficient energy, and may be transferred to the non-volatile data storage only then, if the energy provided by the Wiegand module decreases below a threshold value.

Alternatively, in an exemplary embodiment of the invention, however, the data storage may also be only a non-volatile data storage, for example the said FRAM or the EEPROM.

In an exemplary embodiment of the invention, the processing electronics may be configured (i) to incorporate (or receive) both the direction informations and the magnetic pole informations in a sequence, to determine the number of the revolutions or of the linear displacements of the object on the basis of the direction information and the magnetic pole informations, and to store the corresponding value in the data storage, (ii) to perform, on the basis of the sequence of the direction informations and the magnetic pole informations, an error detection indicating whether one of the revolutions or one of the linear displacements of the object has not been recognized partially or completely, and (iii) upon recognition of the error, to determine a corresponding correction of said number, and to correct said value.

In an exemplary embodiment of the invention, the resolution of the number of revolutions and linear displacements may depend on the number of the permanent magnets or rather the magnetic poles of the permanent magnet arrangement. If the above-mentioned parameter amounts to n=1, the resolution may be 0.5. When increasing the parameter n, the resolution may increase accordingly. The correction of said number and of said value may be effected according to the resolution.

In a further exemplary embodiment of the invention, the processing electronics may be configured to determine the number of the revolutions or of the linear displacements as a function of the direction. That is, a sign may be assigned to said one direction and to said opposite direction such that the direction informations, which may be obtained by the processing electronics, may be signed (or have a sign) and said number of revolutions or linear displacements may either be increased or be reduced as a function of the direction, in which the permanent magnet arrangement moves.

Alternatively or additionally, in a further exemplary embodiment of the invention the processing electronics may be configured to determine the amount of the number of the revolutions or of the linear displacements as a function of the direction. That is, the direction informations, which may be obtained by the processing electronics, may not be signed (or may not have a sign) so that the number of the revolutions or of the linear displacements may be increased independently from the direction, in which the permanent magnet arrangement moves.

In an exemplary embodiment of the invention, the temporal sequence, in which the direction informations and the magnetic pole informations may be incorporated (or received), may comprise, in total, at least two consecutive direction informations and two consecutive magnetic pole informations, including the received direction informations and magnetic pole informations.

In an exemplary embodiment of the invention, the temporal sequence of the direction informations and the magnetic pole informations may be, for example, stored in a shift-register storage, which may operate according to the FIFO principle (First in, First out). The sequence stored in the shift-register storage may contain at least two consecutive direction informations and two consecutive magnetic pole information.

Alternatively, in another exemplary embodiment of the invention, the data storage, in particular the volatile and/or the non-volatile data storage, may have reserved storage regions, in which the penultimate direction informations and magnetic pole informations may be stored. After detecting the voltage impulse, the processing electronics may receive the most current direction and magnetic pole informations, which it may keep in an internal storage and thereby may incorporate in the sequence. The information kept in the internal storage and the information kept in the reserved storage region together may form the sequence, on the basis of which the error detection may be performed. After performing the error detection, the informations in the reserved storage regions may be overwritten by those from the internal storage.

In an exemplary embodiment of the invention, if the processing electronics, after detecting the voltage impulse, determines for example that one of the magnetic poles of the permanent magnet arrangement is located at said first position, this may mean that the permanent magnet arrangement moves in said one direction. However, if the processing electronics determines, after detecting the voltage impulses, that one of the magnetic poles of the permanent magnet arrangement is located at said second position, this may means that the permanent magnet arrangement moves in said direction that is opposite to said one direction.

In addition, in a further exemplary embodiment of the invention the processing electronics, after detecting the voltage impulse, may receive the magnetic pole informations indicating which one of the magnetic poles of the permanent magnet arrangement is located at the determined first or second position.

The direction informations and magnetic pole informations thus obtained may be stored. On the whole, the value can be reduced to two bits. The bit value 0 or 1 of one of the bits may indicate the direction informations, i.e. whether, after detecting the voltage impulse, one of the magnetic poles of the permanent magnet arrangement is located at said first or said second position. The bit value 0 or 1 of the second bit may indicate, whether after detecting the voltage impulse, the north pole or the south pole of the permanent magnet arrangement is located at said first or said second position.

In an exemplary embodiment of the invention, the error detection can be effected on the basis of at least two direction informations and magnetic pole informations, which may be stored in the sequence.

Preferably, in an exemplary embodiment of the invention, if, in the sequence, the direction informations and the magnetic pole informations are identical, the error detection may provide a result indicating that an error is present, and the correction may be determined to the effect that the value in the data storage may not be changed.

This may be the case for example, if the processing electronics determines the number of revolutions or of linear displacements as a function of the direction and the values in the sequence are consecutively identical.

Further preferably, in an exemplary embodiment of the invention, if, in the sequence, consecutive direction informations are identical and consecutive magnetic pole informations are different, the error detection may provide a result indicating that no error is present, and the number of the revolutions or the linear displacements of the object may be determined correspondingly and the corresponding value may be stored in the data storage.

This may hold for example in cases, when the processing electronics determines the number of the revolutions or of the linear displacements as a function of the direction or independent from the direction, and the values in the sequence are consecutively different only in respect of the magnetic pole information.

Further preferably, in an exemplary embodiment of the invention, if, in the sequence, consecutive direction informations and magnetic pole informations are different, the error detection may provide a result indicating that an error is present, and the correction may be determined to the effect that said value in the data storage may be supplemented.

This may hold for example in cases, when the processing electronics determines the number of the revolutions or of the linear displacements as a function of the direction or independently from the direction, and the values in the sequence are consecutively different in respect of the direction informations and the magnetic pole informations.

Further preferably, in an exemplary embodiment of the invention, if, in the sequence, consecutive direction informations are different and consecutive magnetic pole informations are identical, the error detection may provide a result indicating that no error is present, and the number of the revolutions or of the linear displacements of the objects may be determined correspondingly, and the corresponding value may be stored in the data storage.

This may hold for example in the case, when the processing electronics determines the number of the revolutions or of the linear displacements as a function of the direction or independently from the direction, and said values in the register storage are consecutively different only in respect of the direction informations.

In an exemplary embodiment of the invention, the sensor element of the counting sensor according to the invention may be, for example, an additional coil, which encloses the Wiegand wire additionally, and the processing electronics is configured to receive the direction information by evaluating a temporal occurrence of the output signal of the additional coil with respect to the voltage impulse.

In an exemplary embodiment of the invention, the additional coil may be spatially offset with respect to the coil of the Wiegand module.

In an exemplary embodiment of the invention, the processing electronics may be configured to evaluate the temporal occurrence of the output signal or rather the voltage impulse of the additional coil with respect to the voltage impulse of the coil of the Wiegand module and, based thereon, to determine whether the permanent magnet arrangement moves in said one direction or in said direction opposite to said one direction.

In an exemplary embodiment of the invention, the processing electronics may obtain the magnetic pole informations by evaluating the polarity of either the voltage impulse of the coil of the Wiegand module or the voltage impulse of the additional coil.

Alternatively, in an exemplary embodiment of the invention, the sensor element may be at least a first Hall element, wherein the first Hall element may be arranged such that the processing electronics may obtain the directional informations by the evaluation of the output signal of the first Hall element.

As has been discussed in the preceding, the magnetic domains of the Wiegand wire may change their orientation abruptly, if (i) the permanent magnet arrangement moves in said one direction, and one of the magnetic poles of the permanent magnet arrangement reaches said first position, or if (ii) the permanent magnet arrangement moves in said direction opposite to said one direction, and one of the magnetic poles of the permanent magnet arrangement reaches said second position.

In an exemplary embodiment of the invention, the arrangement of the first Hall element may be selected preferably such that, after detecting the voltage impulse of the Wiegand module, the first Hall element (i) may provide no output signal, if the permanent magnet arrangement moves in said one direction and one of the magnetic poles of the permanent magnet arrangement is located at the first position, and (ii) may provide an output signal, if the permanent magnet arrangement moves in said direction opposite to said one direction and one of the magnetic poles of the permanent magnet arrangement is located at said second position.

Alternatively, in an exemplary embodiment of the invention, the first Hall element may also be arranged such that after detecting the voltage impulse, it may always provide an output signal independently from the direction, in which the permanent magnet arrangement moves. In this case, in order to obtain the direction information, the processing electronics may evaluate the output signal of the first Hall element in that it puts the magnetic pole, which is recognized by the first Hall element, in relation to the polarity of the voltage impulse.

In an exemplary embodiment of the invention, the counting sensor may contain a further sensor element in the form of a second Hall element, wherein the first Hall element and the second Hall element may be arranged such that the processing electronics (i) may obtain the direction informations redundantly by the evaluation of the output signal of the first Hall element and the output signal of the second Hall element, and (ii) may obtain the magnetic pole informations redundantly by the determination of the polarity of the voltage impulse generated by the coil of the Wiegand module, by the evaluation of the output signal of the first Hall element, and by the evaluation of the output signal of the second Hall element.

In an exemplary embodiment of the invention, the first and the second Hall element may be preferably arranged on a measurement substrate, which may define a measurement plane, wherein the Hall elements may be arranged on the measurement substrate such that their regions, which are sensitive to the magnetic field, may extend in the measurement plane and/or form a portion of the measurement plane.

In an exemplary embodiment of the invention, the Hall elements and the processing electronics may be integrated together in a common integrated circuit on the measurement substrate, wherein the circuit may be based either on a unitary integration technology, for example the CMOS technology, or may be based on different integration technologies, for example the CMOS and the FRAM technology.

In an exemplary embodiment of the invention, in the autonomous mode, in which the counting sensor may not be supplied with outside energy (or external energy), the first and the second Hall elements and the processing electronics may be supplied with energy that may be provided by the Wiegand module.

In an exemplary embodiment of the invention, the first Hall element and the second Hall element may be arranged such that the processing electronics, by the evaluation of the output signal of the first Hall element and the output signal of the second Hall element, may obtain at least redundant direction informations about whether the permanent magnet arrangement moves in said one direction or in said opposite direction.

In an exemplary embodiment of the invention, the processing electronics may evaluate the output signals of the Hall elements for the obtainment of the redundant direction informations preferably by comparing the output signals or rather the output voltages of the Hall elements with corresponding defined voltage thresholds.

In an exemplary embodiment of the invention, the first Hall element and the second Hall element may be arranged such that the processing electronics, by the evaluation of the voltage impulse of the Wiegand module, the output signal of the first Hall element and the output signal of the second Hall element, may obtain redundant direction and magnetic pole informations about whether the north pole or the south pole is located at said first or said second position, and whether the permanent magnet arrangement moves in said one direction or in said opposite direction.

In an exemplary embodiment of the invention, the said redundant direction and magnetic pole informations may be obtained by the processing electronics in particular then, if the first Hall element and the second Hall element are arranged such that they output signals of different height (in respect of the amount, in respect of the signal strength) as a function of whether, after the detecting of the voltage impulse, the north pole or the south pole are located at said first or said second position.

In an exemplary embodiment of the invention, the first Hall element may be arranged corresponding to the first position, and the second Hall element may be arranged corresponding to the second position.

Stated differently, upon movement of the permanent magnet arrangement in said one direction, the first Hall element, upon the occurrence and/or after the detection of the voltage impulse of the Wiegand module, may output an output signal corresponding to the north pole or the south pole, whereby the second Hall element may output no output signal upon the occurrence and/or the detection of the voltage impulse. Upon reversal of the movement direction of the permanent magnet arrangement, i.e. if the permanent magnet arrangement moves in said opposite direction, the second Hall element may output an output signal corresponding to the north pole or the south pole upon the occurrence and/or after the detection of the voltage impulse, whereby the first Hall element may provide no output signal upon the occurrence and/or after the detection of the voltage impulse.

In an exemplary embodiment of the invention, the redundant direction informations in respect of the movement direction of the permanent magnet arrangement may be obtained by the processing electronics by evaluating the different output signals of the Hall elements, whereas the redundant magnetic pole informations with respect to the polarity of the permanent magnet arrangement, i.e. whether the north pole or the south pole is located at said first or said second position, may be obtained by the processing electronics from the output signal of the Hall element, which may be associated with the corresponding position, and the polarity of the voltage impulse that may be output from the Wiegand module.

Alternatively, in an exemplary embodiment of the invention, the redundant direction and magnetic pole informations may be obtained by the processing electronics in particular then, if the first Hall element and the second Hall element are arranged such that, as a function of whether the north pole or the south pole is located at said first or said second position, they output signals of the same height (in respect of the amount, in respect of the signal strength).

In an exemplary embodiment of the invention, in this case, in order to obtain the redundant direction informations, the processing electronics may evaluate the output signals of the first and the second Hall elements in that it may put the magnetic pole that may be recognized by the first Hall element in relation to the polarity of the voltage impulse, and similarly the magnetic pole that may be recognized by the second Hall element in relation to the polarity of the voltage impulse.

In an exemplary embodiment of the invention, the redundant magnetic pole informations may be obtained by the evaluation of the output signal of the first and/or the second Hall element and the polarity of the voltage impulse that may be output from the Wiegand module.

In the following, preferred embodiments of the invention are discussed with reference to the appended figures.

DETAILED DESCRIPTION OF EXEMPLARY EMBODIMENTS

Figure 1:
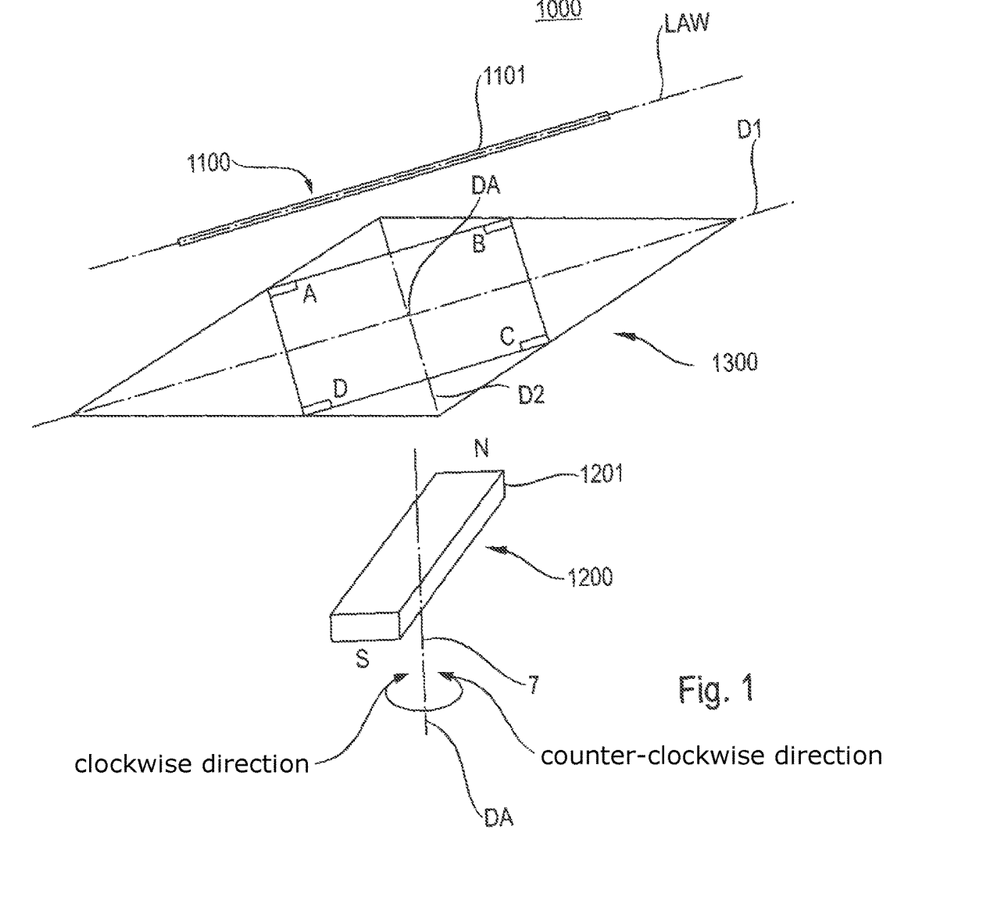
FIG. 1 shows a perspective view of a counting sensor according to the invention according to a first preferred embodiment of the invention.

FIG. 1 shows a perspective view of a first preferred embodiment of a counting sensor 1000 according to the invention.

The counting sensor 1000 may comprise a Wiegand module 1100, which may have on the one hand a Wiegand wire 1101 and on the other hand a coil, which is not shown and which may be coiled (or wound) around the Wiegand wire 1101, and a permanent magnet arrangement 1200, which may be composed of a rectangular permanent magnet 1201 in this first preferred embodiment. The permanent magnet 1201 may also be cylindrical or may have any other regular shape.

The permanent magnet arrangement 1200 may be rotatably supported such that a north pole N and a south pole S of the permanent magnet arrangement 1200 may revolve (or turn) around a rotation axis DA. The revolution (or turn) may be effected either in one direction, for example the clockwise direction, or in a direction that is opposite to said one direction, the counter-clockwise direction.

In an intended use of the counting sensor 1000, the permanent magnet arrangement 1200 may be fixed to a revolving object to be monitored such that the rotation axis DA of the permanent magnet arrangement 1200 may correspond to the rotation axis of the object, and thus the permanent magnet arrangement 1200 may revolve together with the object to be monitored.

The Wiegand wire 1101 may be composed of a soft-magnetic core and a hard-magnetic shell. Upon rotation of the permanent magnet arrangement 1200, the magnetic domains and/or Weiss domains of the Wiegand wire 1101 may change their orientation abruptly (or suddenly) as from a specific change and/or rotation of the magnetic field, whereby as a result of this, a voltage impulse may be effected, which may be output from the coil that may be coiled around the Wiegand wire 1101 and/or that may enclose the Wiegand wire. Because of the formation of the Wiegand wire 1101 from soft- and hard-magnetic regions (core and shell), the abrupt (or sudden) change of the orientation of the domains may occur as a function of the rotation direction of the permanent magnet arrangement 1200 in different positions (or postures) of the permanent magnet arrangement 1200.

If the permanent magnet arrangement 1200, starting from a position, in which a longitudinal axis of the rectangular permanent magnet is oriented parallel to a longitudinal axis LAW of the Wiegand module 1100, rotates, for example, in the clockwise direction, the abrupt change of the orientation of the domains may be effected after a rotation of the rectangular permanent magnet 1201 by ca. 135°. In this position of the permanent magnet 1201, either the corresponding north pole N or the south pole S may be located at a first position.

If, by contrast, the permanent magnet arrangement 1200 rotates, starting from the explained starting position, in the counter-clockwise direction, again, the abrupt change of the orientation of the domains may be effected after a rotation of the rectangular permanent magnet 1201 by ca. 135°, whereby in this position of the permanent magnet 1201, the north pole N or the south pole S may be located at a second position, which may be different from said first position.

Besides the Wiegand module 1100 and the permanent magnet arrangement 1200, the counting sensor 1000 according to the invention and according to the first preferred embodiment of the invention may further comprise a measurement substrate 1300, which may have preferably a quadratic shape. As can be seen from FIG. 1, the measurement substrate 1300 may be located between the Wiegand module 1100 and the permanent magnet arrangement 1200, wherein the measurement substrate 1300 may define a measurement plane, which may extends parallel to the movement plane, in which the rectangular permanent magnet 1201 may rotate.

Figure 2:
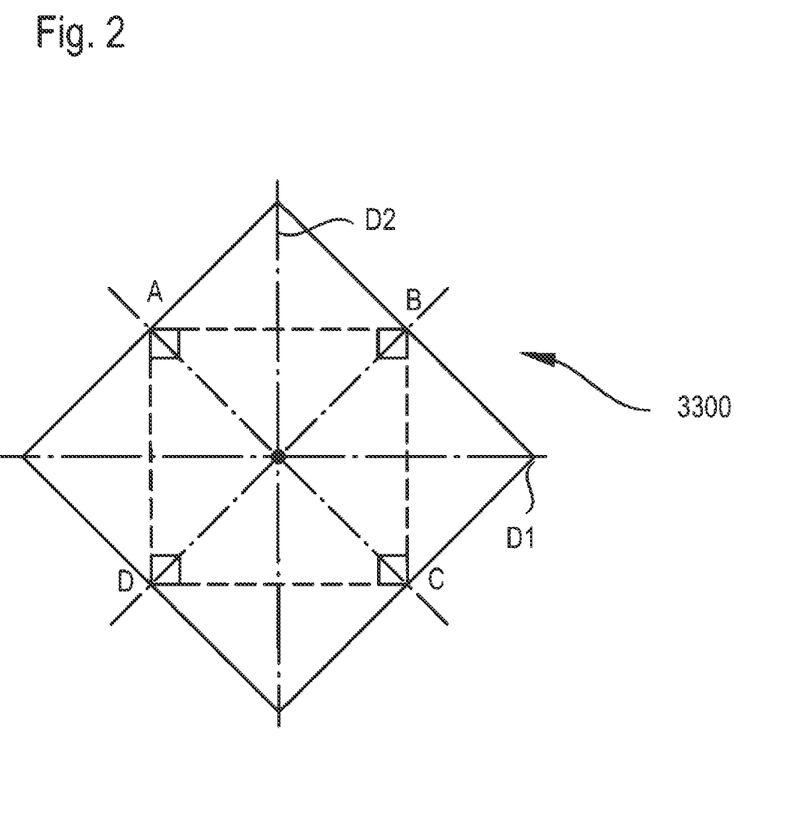
FIG. 2 shows a measurement substrate, which may be used in the counting sensor according to the first or the second preferred embodiment.

A plurality of sensor elements in the form of Hall elements A to D may be arranged on the measurement substrate 1300. The plurality of Hall elements is well visible both in the perspective view according to FIG. 1 and in the top view of the measurement substrate 1300 shown in FIG. 2. FIG. 2 corresponds to a view of the measurement substrate 1300 in the direction of the rotation axis DA, which may intersect the measurement substrate 1300 in its center, and which may run perpendicular to the plane of the drawing.

The four Hall elements A to D that are shown form a part of the counting sensor according to the invention, wherein their output signals may be evaluated for determining the position and rotation direction of the permanent magnet arrangement 1200 in an autonomous mode that is still to be discussed.

All the Hall elements may be arranged on the measurement substrate 1300 such that their regions, which are sensitive to the magnetic field, may extend in the measurement plane.

Each one of the Hall elements A to D may be arranged both at an outer edge of the measurement substrate 1300 and on a center of an edge of the corresponding outer edge of the measurement substrate 1300.

The Hall elements A to D, respectively, have four terminals, wherein two of the terminals are the current contacts and the other two terminals form the Hall voltage contacts of the corresponding Hall element.

Alternatively, the Hall elements A to D may also be octagonal Hall elements having, respectively, eight terminals, wherein in this case, also a diagonal, which may connect two opposing corners of the respective octagonal Hall element, may stand perpendicular to the corresponding outer edge. In this case, two opposing terminals, respectively, may form the current contacts, and the terminals, which may be located orthogonal to the current contacts, may form the Hall voltage terminals.

For eliminating interference fields and interference parameters in the output signals, the corresponding output signals of the Hall elements A to D may be evaluated pairwisely according to the difference principle. In this connection, the output signals of the Hall elements A and C may be evaluated such that the portions of the output signals, which may be based on magnetic field components, which may be oriented oppositely and may penetrate the Hall elements A and C, may add to one another, whereas the portions of the output signals, which may be based on magnetic field components, which may be equally oriented and may penetrate the Hall elements A and C, may be subtracted and thus may cancel one another. The output signals of the two other Hall elements B and D may be evaluated similarly.

In particular, in an autonomous mode, in which the counting sensor 1000 may not be supplied with outside energy, the Hall elements A to D may be necessary for the determination of a value, which may reflect the number of revolutions (or rotations) and/or turns of the permanent magnet arrangement 1200.

In FIG. 2, the horizontal diagonal D1 of the measurement substrate 1300 may correspond to the orientation of the longitudinal axis LAW of the Wiegand module 1100. If the permanent magnet 1201 of the permanent magnet arrangement 1200 rotates about the rotation axis DA in the clockwise direction, the abrupt changes of the magnetic domains of the Wiegand wire 1101 may be effected, as has been discussed in the preceding, if the north pole N or the south pole S is located at the explained first position.

In the measurement plane, this first position may correspond approximately to the position of the Hall element B, as can be seen in the FIGS. 1 and 2. Stated otherwise, the first position and the position of the Hall element B may be arranged one after another and/or on top of each other in the direction of the rotation axis DA.

Stated otherwise, the north pole N or the south pole S of the permanent magnet 1201 may be located at said first position over the Hall element B.

If the permanent magnet arrangement 1200 is arranged in the position, in which one of the poles is located at said first position, the respective other magnetic pole may be in the same spatial relation to the Hall element D. In this position, the magnetic field, which may be generated by the permanent magnet arrangement 1200, may penetrate the active regions of the Hall elements B and D, which are sensitive to the magnetic field, in respective opposite orientation such that the output signals, which may be evaluated according to the difference principle, may add to one another. Due to their spatial displacement in this position of the permanent magnet arrangement 1200, the other pair of Hall elements A and C may hardly experience the magnetic field of the permanent magnet arrangement 1200, which may be why their output signals strive against zero (already because of the difference principle), when the north pole N or the south pole S of the permanent magnet arrangement 1200 is located at said first position and the coil of the Wiegand module 1100 outputs the voltage impulse.

Upon movement of the permanent magnet arrangement 1200 in the opposite direction, i.e. upon rotation of the rectangular magnet 1201 in the counter-clockwise direction, the abrupt change of the orientation of the magnetic domains of the Wiegand wire 1101 may be effected in an equivalent manner, if the north pole N or the south pole S of the permanent magnet arrangement 1200 is located in said second position that is different from said first position.

The second position may correspond to the Hall element C. If the north pole N or the south pole S is located at said second position, the respective other magnetic pole may be in the same spatial relation to the Hall element A. The output signals of the Hall elements A and C may be evaluated in the same manner as those of the Hall elements B and D.

In the normal case, as a function of the direction in which the permanent magnet arrangement 1200 may revolve, directional informations may be obtained from the output signals of the pairs of the Hall elements A, C and B, D indicating whether the permanent magnet arrangement 1200 rotates in said one direction—the clockwise direction—or in said direction that is opposite to said one direction—the counter-clockwise direction.

Further to this, also the magnetic pole informations may be detected from the polarity of the output signals of the Hall elements A, C and B, D, i.e. whether the north pole N or the south pole S is located at the first or second position.

Insofar, the resolution of the counting sensor according to the invention in the autonomous mode may amount to one half turn.

Theoretically, the number of the Hall elements A to D can be reduced. For example, all except for one single Hall element could be omitted. The conclusion to the movement direction of the permanent magnet arrangement 1200 and/or the direction informations may then be drawn from the output signal of the remaining Hall element upon the occurrence and/or after the detection of the voltage impulse from the Wiegand module 1100. Namely, if the Hall element provides no output signal upon the occurrence and/or the detection of the voltage impulse, one may assume that the permanent magnet arrangement 1200 rotates in the direction, for which no Hall element may be provided. The magnetic pole informations about how the polarity of the permanent magnet 1201 may be oriented in this state may be determined from the polarity of the voltage impulse from the Wiegand module.

By contrast, if the remaining Hall element provides output signals, one may assume that the permanent magnet arrangement 1200 rotates in the corresponding direction.

In the autonomous mode, the output signals of the pair of the Hall elements A, C may be evaluated according to the difference principle for determining the number of revolutions, and the output signals of the pair of Hall elements B, D may also be evaluated according to the difference principle.

Figure 3:
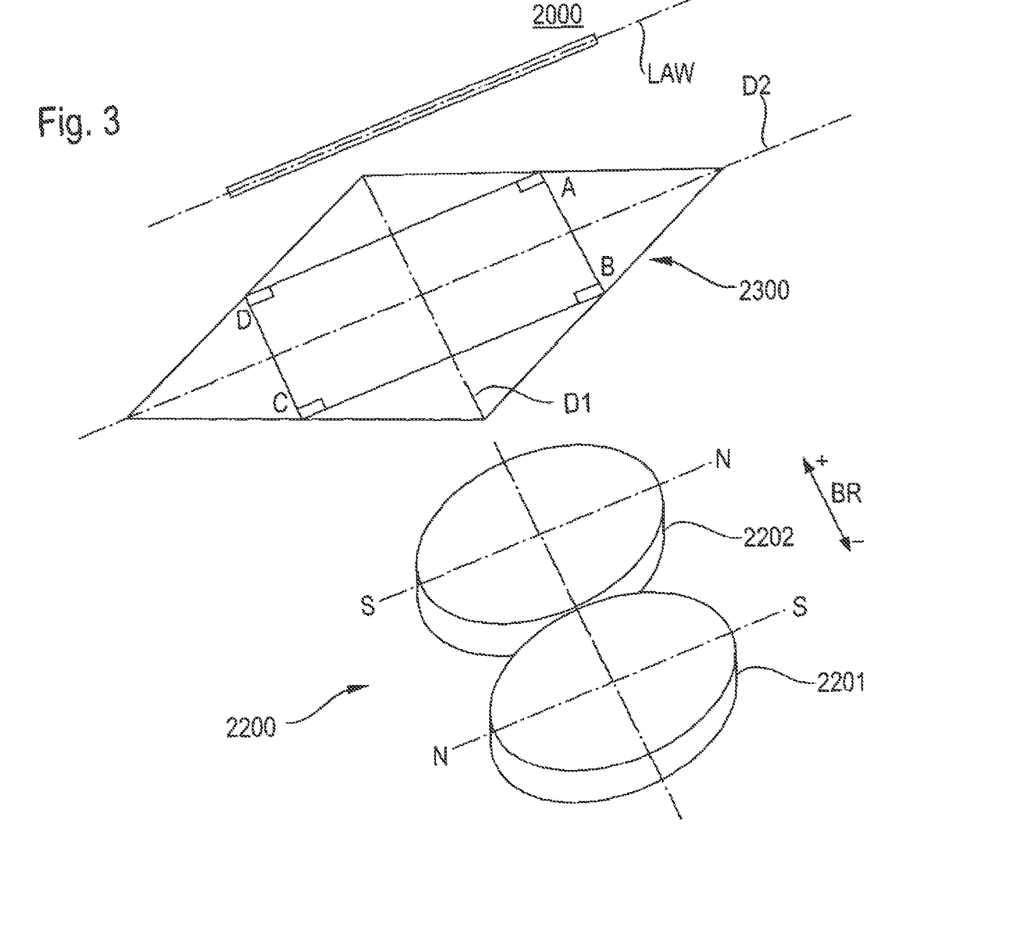
FIG. 3 shows a counting sensor according to the second preferred embodiment of the invention, wherein the counting sensor is configured to determine a linear displacement of a permanent magnet arrangement that is composed of two permanent magnets.

FIG. 3 shows a second preferred embodiment of a counting sensor 2000 according to the invention.

The difference to the counting sensor 1000 of the first preferred embodiment may consist in that the counting sensor 2000 according to the second preferred embodiment cannot perform revolutions, but linear displacements.

The counting sensor 2000 may contain a Wiegand module 1100, which may be identical to that of the first preferred embodiment, which is why reference is made to the corresponding embodiments.

In addition to this, the counting sensor 2000 may also have a permanent magnet arrangement 2200, which may be composed of two cylindrical permanent magnets 2201, 2202 in this embodiment. However, the permanent magnets 2201, 2202 may also have other shapes.

According to the intended use, the permanent magnet arrangement 2200 may be displaced linearly along the movement direction BR shown. Thereby, the movement may be effected in the one direction, positive movement direction BR, or in the negative movement direction BR that is opposite thereto. The permanent magnets 2201, 2202 may be oriented mutually oppositely polarized such that their north-pole-south-pole-axes may be oriented perpendicular to the movement direction BR.

The counting sensor 2000 may also contains a measurement substrate 2300, on which also a plurality of sensor elements in the form of Hall elements and a processing electronics may be arranged.

The measurement substrate 2300 may be identical to that of the first embodiment except for the difference that it may not be the output signals of the Hall elements, which lie on diagonals of the virtual square and/or rectangular, which may be jointly evaluated, but it may be those of the Hall elements, which lie on one side of the measurement substrate 2300 with respect to the diagonal D2, which may be jointly evaluated. In view of FIG. 3 this may mean that the output signals of the Hall elements B, C may be evaluated jointly and/or simultaneously for the determination of the value, which may indicate the number of repeating linear displacements.

The same may hold for the evaluation of the output signals of the Hall elements A, D.

The diagonal D1 of the measurement substrate 2300, which may run perpendicular to the diagonal D2, may be congruent with the symmetry axis of the permanent magnets 2201, 2202, which may run in the movement direction BR, when seen from the direction perpendicular to the measurement substrate 2300. Stated otherwise, the plane, in which the symmetry axes of the permanent magnets 2201, 2202, which may point in the movement direction BR, and the diagonal D1 may be running, may be perpendicular to the measurement plane.

If the permanent magnet arrangement 2200 in FIG. 3 moves into said one direction or in said direction opposite thereto (positive or negative BR direction), this may result in a change/pole reversal of the magnetic field experienced by the Wiegand module 1100. This change of the magnetic field may lead to the abrupt change of the orientation of the magnetic domains of the Wiegand wire 1101 as from a specific amplitude, as has already been explained, and thus to the generation of the voltage impulse from the coil of the Wiegand module 1100. Due to the formation of the Wiegand wire 1101 of soft-magnetic and hard-magnetic regions, the triggering of the voltage impulse may be effected in such different positions of the permanent magnet arrangement 2200 (first and second position) that in the normal case, the direction informations indicating the movement direction BR of the permanent magnet arrangement 2200 and the magnetic pole informations indicating the orientation of the detected permanent magnet 2201 or 2202 may be obtained from the output signals of the Hall elements B, C or rather A, D.

If the permanent magnet arrangement 2200 moves, for example, in the positive direction shown in FIG. 3, upon triggering of the voltage impulse, the south pole of the permanent magnet 2201 may be located at the Hall element B that may correspond to said first position and the north pole may be located at the Hall element C. Stated otherwise, the Hall elements B, C and the magnetic poles of the permanent magnet 2201 may be arranged on top of each other in the direction perpendicular to the movement direction BR. Both Hall elements B, C output a corresponding signal, whereas in this state the Hall elements A, D may be located approximately between the permanent magnets 2201, 2202 and accordingly output no and/or very small output signals.

If, by contrast, the permanent magnet arrangement 2200 moves in the negative direction shown in FIG. 3, upon triggering the voltage impulse, the north pole of the permanent magnet 2202 may be located at the Hall element A corresponding to said second position and the south pole is located at the Hall element D. Stated otherwise, the Hall elements A, D and the magnetic poles of the permanent magnet 2202 may be arranged on top of each other in the direction perpendicular to the movement direction BR. Both Hall elements A, D may output an according signal, whereas in this state the Hall elements B, C may be located approximately between the permanent magnets 2201, 2202 and accordingly may output no and/or very small output signals.

Theoretically, also in this embodiment, the number of the Hall elements may be reduced to one single [element].

Figure 4:
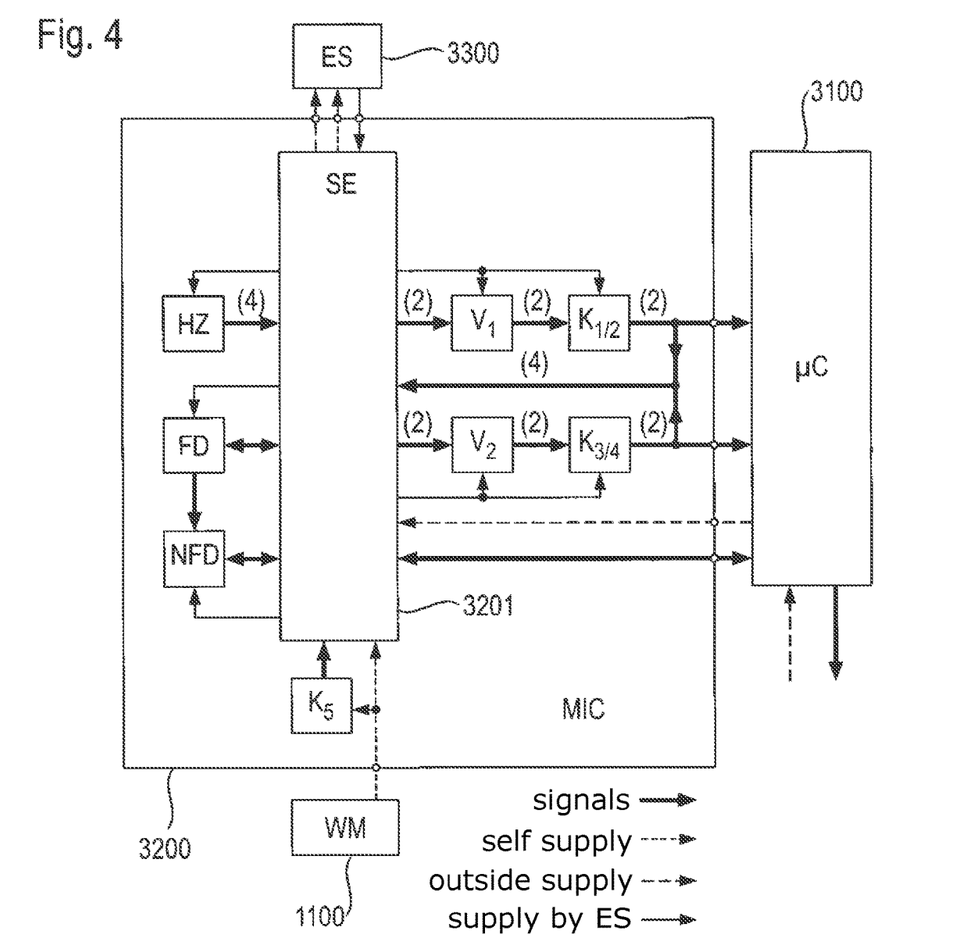
FIG. 4 shows a schematic composition of the whole electronics, which may be used in the counting sensor according to the first preferred embodiment and the second preferred embodiment.

FIG. 4 shows schematically the composition of the whole electronics of the counting sensor according to the first or second preferred embodiment of the invention.

The whole electronics may contain a processing electronics, which may be electrically connected to the Hall elements HZ, a micro-controller 3100, the Wiegand module 1100 and an energy storage 3300. All the elements, which may be contained in the square that is referenced MIC in FIG. 4, may be arranged on the respective measurement substrate. Preferably, the processing electronics may be integrated on the measurement substrate. The Wiegand module 1100 may be arranged on a printed circuit board, on which, for example, also the measurement substrate, the energy storage 3300 and the micro-controller 3100 may be arranged.

The processing electronics may be completely arranged on the measurement substrate 3200, wherein all elements of the processing electronics and the Hall elements may be based preferably on an identical integration technology. Preferably, the measurement substrate may concern a silicon substrate, on which all the elements may be realized, for example, in the CMOS integration technology.

In the following, the whole electronics is described under the assumption that the counting sensor comprises the four Hall elements A to D for the determination of said value, which may indicate said number of revolutions and/or linear displacements.

The counting sensor according to the invention may determine the number of the revolutions or of the linear displacements preferably as a function of the direction, i.e. a positive sign may be associated to one movement direction, wherein the revolutions or the linear displacements in this direction may result in an increase of said specific number, and a negative sign may be associated to the opposite direction, wherein the revolutions or the linear displacements in the opposite direction may result in a decrease of said specific number.

In FIG. 4, the shortly dashed lines/arrows symbolize the course of the self-energy supply, the longly dashed lines/arrows symbolize the course of the outside energy supply, the thinly drawn lines/arrows symbolize the course of the supply by the energy storage 3300, and the thickly drawn lines/arrows symbolize the course of the signals.

The counting sensor according to the first and second preferred embodiment may be operated either in a non-autonomous mode, in which the counting sensor may be supplied with outside energy, or in an autonomous mode, in which the counting sensor may be supplied with energy that is stored in the energy storage 3300.

(Non-Autonomous Mode)

In the non-autonomous mode, the outside energy supply may be effected via the micro-controller 3100, which may be connected with the control electronics SE for this purpose. The control electronics SE may charge the energy storage ES 3300, which may be preferably composed of one or more capacitors, with the outside energy. Very particularly preferred, the energy storage ES 3300 may be composed of at least two capacitors having different capacities, wherein a smaller capacitor with a smaller capacity and a larger capacitor having a larger capacity may be provided, which may both be charged with the received outside energy in the non-autonomous mode.

The four Hall elements A to D, which are referenced with HZ in FIG. 4, may be supplied with energy from the energy storage ES. Because at least in the non-autonomous mode, the energy storage ES may be charged with outside energy, the Hall elements HZ may be indirectly supplied with the outside energy, such that all Hall elements may output sequentially (or in a sequence) corresponding output signals as a function of the movement direction of the permanent magnet arrangement.

The four Hall elements HZ may be connected with the control electronics SE and may output their respective four output signals to the control electronics SE, which may process the respective two output signals of the pairs of Hall elements and thus, in result, may receive one signal per pair of Hall elements.

The two signals that may be received in result for both pairs may be output in a blockwise manner via a first amplifier V1 to two comparators K1/2 and in a blockwise manner via a second amplifier V2 to two comparators K3/4. Two of the comparators may perform a comparison with a negative voltage threshold, and the two other ones of the comparators may perform a comparison with a positive voltage threshold, such that each signal, which may be obtained as a result of the difference principle, may be compared with a positive and a negative voltage threshold.

The four resulting output signals of the comparators K1 to K4 may be, on the one hand, returned to the control electronic SE and are, on the other hand, may be output to the micro-controller 3100. The four resulting output signals of the comparators K1 to K4 may enable an interpretation indicating, in which position the permanent magnet arrangement 1200 may be located and/or how the magnetic poles are oriented. The continuous evaluation of the output signals of the Hall elements, which may occur sequentially, also may allow a conclusion indicating in which direction the permanent magnet arrangement 1200 (clockwise direction or counter-clockwise direction) or 2200 (linear displacement in positive or negative movement direction) moves.

From this, the value of repeating movement processes (revolutions or number of complete linear displacements) of the permanent magnet arrangement can be determined. This determination may be effected, on the one hand, in the micro-controller 3100, which may output this value to an application, and, on the other hand, in the control electronics SE, which may store this value in a volatile data storage FD and/or in a non-volatile data storage NFD.

The four Hall elements HZ, the amplifiers V1, V2, the four comparators K1 to K4 as well as the data storages (volatile data storage FD and non-volatile data storage NFD) may also be supplied with energy from the energy storage 3300.

The volatile data storage FD may be for example a register based on the CMOS technology. The non-volatile data storage NFD may be, for example, an EEPROM that may also be based on the CMOS technology. Thereby, both data storages may be configured in particular such that they may operate without problems and may maintain their storage values still at temperatures over 140° C., in particular at 160° C. Hereby, both data storages may be in particular configured such that they may operate without problems and may maintain their storage values still at temperatures over 140° C., in particular at 160° C.

If the output signals of the comparators K1 to K4 are not needed in the micro-controller 3100, the output of the output signals of the comparators K1 to K4 to the micro-controller 3100 may not be necessary. In this case, the latter one may have access only to the volatile data storage and/or the non-volatile data storage and may output the correspondingly read value to an application to the outside.

(Autonomous Mode)

In some applications, the case may occur that the outside energy supply breaks down or is temporarily not available. In this situation, care must be taken that said value, which may indicate the number of repeating movement processes (revolutions or number of complete linear displacements), may be sampled and stored continuously such that said value may be available upon re-establishment of the outside energy supply.

In the autonomous mode, the Wiegand module 1100 may take over the energy supply, wherein the Wiegand module may provide voltage impulses as a function of the velocity of the permanent magnet arrangement at a corresponding frequency.

In the autonomous mode, the control electronic SE may take over the control and management of the energy supply of the processing electronics, for example by rectifying the voltage impulses provided from the Wiegand module 1100, and may output them for charging the smaller capacitor of the energy storage ES 3300. In the autonomous mode, the large capacitor may not be charged, but may only provide its energy for example via a diode, to the smaller capacitor, as necessary.

The energy storage ES, which may be composed of the small and the large capacitor, may be completely and/or very strongly charged initially after discontinuation of the outside energy supply.

In the autonomous mode, the smaller capacitor may supply the Hall elements HZ, the amplifiers V1/V2, the comparators K1 to K4, the data storages FD/NFD, and may be discharged by the corresponding energy requirement in the autonomous mode. As has already been explained, the Wiegand module 1100 may provide the voltage impulses, which may be used for charging the smaller capacitor.

The determination of said value, which may indicate the number of repeating movement processes (revolutions or complete linear displacements) may be effected similarly as in the non-autonomous mode by the evaluation of the output signals of the comparators K1 to K4. The only difference may be that [the evaluation of] the output signals of the Hall elements and thus of the comparators may effected only, if a voltage impulse of the Wiegand module is determined. The determination whether an evaluable voltage signal is present or not, may be performed via a comparator K5, which may be connected directly to the output of the coil of the Wiegand module 1100, as can be seen in FIG. 4, and which may signal to the control electronics SE, whether a voltage signal and/or a voltage impulse, which can be evaluated, is present or not. In this connection, the comparator K5 may compare the voltage that may be output from the coil of the Wiegand module 1100 with a voltage threshold and may signal to the control electronics SE that an evaluable voltage signal and/or voltage impulse may be present, if the voltage that may be output from the coil of the Wiegand module 1100 exceeds the voltage threshold.

As has been explained in detail in the preceding, the voltage impulse from the Wiegand module 1100 may be triggered as a function of the direction, in which the permanent magnet arrangement may move, when the north pole or the south pole of the permanent magnet arrangement is located at said first or said second position. Thus, both the orientation of the permanent magnet arrangement and their movement direction can be determined from the output signals of the comparators K1 to K4 (direction informations and magnetic pole informations). On the basis of this, said value, which may indicate the number of repeating movement processes, may be determined, may be stored in the volatile storage and, if necessary, may be transferred to the non-volatile storage.

During the operation, the case may occur that the Wiegand module 1100 and/or its coil may output a "rudimentary" voltage impulse, which in fact may exceed the voltage threshold of the comparator K5, but however may not provide sufficient energy to perform the storing process of said value, which may indicate the number of repeating movement processes, in the volatile storage and/or the non-volatile storage. In this case, the large capacitor may take over the bridging energy supply by transferring the missing energy to the small capacitor. For example, the Wiegand module 1100 and the small capacitor may be configured such that the Wiegand module 1100 may charge the small capacitor with each voltage impulse to ca. 8 to 9 V. By contrast, the large capacitor may be configured such that in a strongly charged state it may have a voltage of, for example, 5 V and/or outputs such voltage. That is, the large capacitor transfers energy to the small capacitor, if the voltage of the smaller capacitor falls below 4.4 to 4.6 V (taking into account a diode), and thus the performing of the storage process may be ensured.

Preferably, the large capacitor may be configured such that it can take over this bridging energy supply, thereby taking into account leakage currents, as from the discontinuation of the outside energy supply, for a minimum time period of 20 min, 30 min, 1 hour, 5 hours, 1 day or plural days.

As will be understood, an output of the stored value to the micro-controller may not occur in the autonomous mode.

In this respect, it may be noted that the reliability of the counting sensor according to the invention may be strongly increased in particular in the autonomous mode. The reason for this may be that the determination of the movement direction of the permanent magnet arrangement may always occur on the basis of the output signals of plural Hall elements. In the present embodiment of the electronics, the two signals, which may have been obtained according to the difference principle, may be transferred to the four comparators K1 to K4 and the correspondingly obtained four output signals of the comparators may be jointly evaluated and/or may be put in relation to one another. The signals that may be output by the comparators contain, for a correct manner of functioning of all elements, redundant direction informations in respect of the movement direction of the permanent magnet arrangement, because one of the pairs of Hall elements (upon rotation of the permanent magnet arrangement: A, C or B, D; upon linear displacement of the permanent magnet arrangement: A, D or B, C) may inevitably output signals after the detection of the voltage impulse as a function of the movement direction of the permanent magnet arrangement, wherein the output signals may result in an exceeding of the used threshold values of the comparators K1 to K4, whereas the other pair should output no output signals.

In addition to this, the reliability in the autonomous mode may be further increased preferably in that not only redundant direction informations with respect to the movement direction of the permanent magnet arrangement may be obtained via the comparators K1 to K4, but also redundant magnetic pole informations with respect to the orientation of the poles of the permanent magnet arrangement. The evaluation of the signals obtained from the comparators K1 to K4 may provide a conclusion indicating whether the north pole or the south pole of the permanent magnet arrangement is located at said first or said second position. The same magnetic pole informations may, in addition to this, be obtained redundantly by evaluating the polarity of the voltage impulse that is output from the Wiegand module 1100.

Ultimately, the reliability may be increased also by the larger capacitor of the energy storage ES 3300, because after a discontinuation of the outside energy supply the probability of error-prone storage processes can be avoided within the stated minimum time period.

(Alternative for the Hall Elements)

In the preceding, it was explained already that one single Hall element on the measurement substrate may be sufficient. In this embodiment of the measurement substrate, only two comparators may be present. Alternatively, said one Hall element may be replaced by one additional coil, which may be wound around the Wiegand wire spatially offset to the coil of the Wiegand module. In this case, no Hall elements may be present on the measurement substrate.

The direction informations and the magnetic pole informations may be obtained simply only, if only one single Hall element or the additional coil is used as the sensor element.

(Error Detection)

In addition or alternatively to the provision of the large capacitor, which may be able to prevent erroneous storage processes in the autonomous mode at least within the explained minimum time period by transferring its stored energy to the small capacitor, and in addition or alternatively to the redundant obtainment of the direction informations and magnetic pole informations, the counting sensor according to the invention in fact may correct erroneous storage processes by the following error detection. In particular, a precise counting sensor may be established by this.

If the counting sensor according to the invention does not have the large capacitor, or if this is completely discharged, the occurrence of a rudimentary voltage impulse of the Wiegand module may result in that the determined value of the number of revolutions or linear displacements cannot be stored in the volatile and/or non-volatile storage. Insofar, the error may occur that the value stored by the counting sensor is not correct.

In order to prevent this case, the processing electronics contains the function of the following error detection, which may be preferably performed constantly during the operation.

If the control electronics SE may detect the voltage impulse of the Wiegand module, it determines the direction informations and magnetic pole informations by determining whether the north or south pole of the permanent magnet arrangement is located at said first or said second position. The control electronic SE may store this obtained information in the form of, for example, two bits at respective pre-determined reserved storage cells in the volatile and/or non-volatile data storage. For example, in this connection, one of the two bits may provide the direction informations, whether the permanent magnet arrangement moves in said one direction or in said opposite direction, and the other bit may provide the magnetic pole informations as to how the north pole or the south pole of the permanent magnet arrangement is oriented, i.e. whether the north pole or the south pole of the permanent magnet arrangement may be located at said first or said second position.

Upon detecting the subsequent voltage impulse of the Wiegand module, the control electronics SE may determine similarly the direction informations and the magnetic pole informations, which may again be provided for example in the form of two bits. The control electronics SE of the processing electronics may take or may incorporate) these two lastly received (most current) bits and/or the lastly obtained (most current) direction informations and magnetic pole informations in a sequence by storing them, for example, in an internal storage.

The control electronics SE may compare these lastly received bits, which my be for example stored in the internal storage of the control electronics, together with the two bits stored in the volatile and/or non-volatile data storage, which bits may correspond to the directly preceding detection of the direction informations and magnetic pole informations.

In the case of a rudimentary voltage impulse, the control electronics may loose the most current direction informations and magnetic pole informations, because it may no longer store the corresponding two bits (and said value of the number of revolutions or linear displacements) in the volatile and/or non-volatile storage and because the internal storage may be overwritten at the next voltage impulse.

From the comparison of the most current two bits with those, which may correspond to the directly preceding detection of the direction informations and magnetic pole informations, the control electronics SE may determine such an error, whether or not an erroneous storage process may have resulted due to a rudimentary voltage impulse after the penultimate voltage impulse of the Wiegand module, because the two most current bits may be identical to those, which may correspond to the directly preceding detection of the direction information and magnetic pole information, i.e. consecutive direction information and magnetic pole information may be identical.

In this context, the control electronics SE may recognize the following:

1. If the sequence of the bits results in that consecutive direction informations and magnetic pole informations are different, the error detection may provide a result indicating that an error may be present.

The said sequence may mean namely that the direction, in which the permanent magnet arrangement may move, may have changed, and a revolution or linear displacement of the permanent magnet arrangement may not have been detected completely. For example, if the two bits in the volatile and/or non-volatile data storage indicate that the permanent magnet arrangement moves in said one direction and that the north pole is located at said first position and the bits, which have been determined lastly (currently) by the control electronics, may indicate that the permanent magnet arrangement moves in said opposite direction and the south pole may be located at said second position, this may means that preceding direction informations and magnetic pole informations, which may indicate that the permanent magnet arrangement may move in said opposite direction and the north pole may be located at said second position, may not have been recognized and the corresponding bits may not have been stored.

According to this recognized error, a correction may be determined to the effect that said value in the volatile and/or non-volatile data storage may supplemented. The supplementing may depend on the resolution of the counting sensor, which in turn may depend on the number of the permanent magnets and/or the number of the magnetic poles of the permanent magnet arrangement. The bits in the reserved storage regions may be overwritten by the current ones.

2. If the sequence of the bits results in that consecutive direction informations and magnetic pole informations are identical, the error detection of the control electronics SE may provide a result indicating that an error is present.

The mentioned sequence may mean namely that the direction, in which the permanent magnet arrangement moves, may have changed twice. For example, if the two bits in the reserved regions indicate that the permanent magnet arrangement moves in said one direction and the north pole may be located at said first position and the bits, which may have been determined lastly by the control electronics, may reflect this, this may mean that the permanent magnet arrangement may have changed the movement direction two times consecutively, such that identical pairs of bits may be obtained consecutively.

In correspondence to this recognized error, a correction may be determined to the effect that the value in the volatile and/or non-volatile data storage may not be changed. The bits in the reserved storage regions may be overwritten by the current ones.

3. If the sequence of the bits results in that consecutive direction informations are different and consecutive magnetic pole informations are identical, the error correction may provide a result indicating that no error is present.

The number of revolutions or of the linear displacements may be determined correspondingly and the corresponding value may be stored in the data storage, and the bits, which may be stored in the reserved storage regions, which may indicate the direction informations and magnetic pole informations, may be overwritten by the lastly determined bits for the next comparison.

4. If the sequence of the bits results in that consecutive direction informations are identical and consecutive magnetic pole informations are different, the error detection may provide a result indicating that no error is present.

The number of the rotations or of the linear displacements may be again determined correspondingly, and the corresponding value may be stored in the volatile and/or non-volatile data storage, and the bits, which may be stored in the reserved storage regions, which may indicate the direction informations and magnetic pole informations, may be overwritten by the lastly determined bits for the next comparison.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. Counting sensor for counting the number of revolutions or of linear displacements of an object, wherein the counting sensor comprises:
   one single Wiegand module, which is composed of a Wiegand wire having a coil which encloses the Wiegand wire;
   at least one sensor element;
   a processing electronics, which is connected to the sensor element and configured to evaluate an output signal that is output from the sensor element; and
   a permanent magnet arrangement, which is movable relative to the Wiegand module in one direction as well as in a direction that is opposite to said one direction, wherein the permanent magnet arrangement is configured to be arranged at the object such that the permanent magnet arrangement performs the revolutions or the linear displacements together with the object; wherein:

upon movement of the permanent magnet arrangement in said one direction, the coil of the Wiegand module generates a voltage impulse, if a north pole or a south pole of the permanent magnet arrangement is located at a first position, and, upon movement of the permanent magnet arrangement in said opposite direction, the coil of the Wiegand module generates the voltage impulse, if the north pole or the south pole of the permanent magnet arrangement is located at a second position that is different from the first position, in an autonomous mode, in which the counting sensor is not supplied with outside energy, the processing electronics is supplied with energy that is provided by the Wiegand module, the processing electronics is configured, after detecting the voltage impulse that is output from the Wiegand module, to (i) obtain, by an evaluation of the output signal of the sensor elements, direction information indicating whether the permanent magnet arrangement moves in said one direction or in said opposite direction, and (ii) to obtain, by an evaluation of the output signal of the sensor element or by a determination of the polarity of the voltage impulse that is generated by the coil of the Wiegand module, magnetic pole information indicating whether the north pole or the south pole of the permanent magnet arrangement is located at said first or said second position; and a data storage for storing a value, which indicates the number of the revolutions or of the linear displacements; wherein the processing electronics is configured (i) to incorporate both the direction information and the magnetic pole information in a sequence, to determine the number of the revolutions or of the linear displacements of the object on the basis of the direction information and the magnetic pole information, and to store the corresponding value in the data storage, (ii) to perform, on the basis of the sequence of the direction information and the magnetic pole information, an error detection indicating whether one of the revolutions or one of the linear displacements of the object has not been detected partially or completely, and (iii) upon detection of the error, to determine a corresponding correction of said number and to correct said value.

2. Counting sensor according to claim 1, wherein, if, in said sequence, consecutive direction information and magnetic pole information is identical, the error detection provides a result indicating that an error is present, and the correction is determined to the effect that the value in the data storage is not changed.

3. Counting sensor according to claim 1, wherein, if, in said sequence, consecutive direction information is identical and consecutive magnetic pole information is different, the error correction provides a result indicating that no error is present, and said number of the revolutions or of the linear displacements of the object is determined correspondingly, and the corresponding value is stored in the data storage.

4. Counting sensor according to claim 1, wherein, if, in said sequence, consecutive direction information and magnetic pole information is different, the error correction provides a result indicating that an error is present, and the correction is determined to the effect that said value in the data storage is supplemented.

5. Counting sensor according to claim 1, wherein, if, in said sequence, consecutive direction information is different and consecutive magnetic pole information is identical, the error detection provides a result indicating that no error is present, and said number of the revolutions or of the linear displacements of the object is determined correspondingly, and the corresponding value is stored in the data storage.

6. Counting sensor to claim 1, wherein the sensor element encloses the Wiegand wire and wherein the processing electronics are configured to obtain the direction information by evaluating an occurrence in time of the output signal of the sensor element in relation to the voltage impulse.

7. Counting sensor according to claim 1, wherein the sensor element is at least a first Hall element, and the first Hall element is arranged such that the processing electronics receives the direction information by an evaluation of the output signal of the first Hall element.

8. Counting sensor according to claim 7, wherein the counting sensor comprises a further sensor element in the form of a second Hall element, and the first Hall element and the second Hall element are arranged such that the processing electronics (i) obtains the direction information redundantly by the evaluation of the output signal of the first Hall element and of the output signal of the second Hall element, and (ii) obtains the magnetic pole information redundantly by the determination of the polarity of the voltage impulse generated by the coil of the Wiegand module, by the evaluation of the output signal of the first Hall element and by the evaluation of the output signal of the second Hall element.

* * * * *